US011237787B2

(12) United States Patent
Kondo

(10) Patent No.: US 11,237,787 B2
(45) Date of Patent: Feb. 1, 2022

(54) PRINT SYSTEM, PRINT CONTROL APPARATUS, AND STORAGE MEDIUM FOR CONTROLLING PRINT CONTROL APPARATUS

(71) Applicant: SEIKO EPSON CORPORATION, Tokyo (JP)

(72) Inventor: Yohei Kondo, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/877,075

(22) Filed: May 18, 2020

(65) Prior Publication Data

US 2020/0371732 A1 Nov. 26, 2020

(30) Foreign Application Priority Data

May 20, 2019 (JP) .............................. JP2019-094204

(51) Int. Cl.
*G06F 3/12* (2006.01)

(52) U.S. Cl.
CPC .......... *G06F 3/1267* (2013.01); *G06F 3/1207* (2013.01); *G06F 3/1222* (2013.01); *G06F 3/1238* (2013.01)

(58) Field of Classification Search
CPC .... G06F 3/1267; G06F 3/1207; G06F 3/1222; G06F 3/1238; G06F 3/1285; G06F 3/1211; G06F 3/1241
See application file for complete search history.

(56) References Cited

U.S. PATENT DOCUMENTS

| 2007/0133047 | A1* | 6/2007 | Matsueda | ............. | G06F 3/1259 |
| | | | | | 358/1.15 |
| 2011/0304878 | A1* | 12/2011 | Yanazume | .............. | G06F 3/124 |
| | | | | | 358/1.15 |
| 2016/0210091 | A1* | 7/2016 | Martin | .................. | G06F 3/1288 |

FOREIGN PATENT DOCUMENTS

JP 2007-030354 2/2007

* cited by examiner

*Primary Examiner* — Iriana Cruz
(74) *Attorney, Agent, or Firm* — Workman Nydegger

(57) ABSTRACT

In a first print system controlling a first print apparatus and a second print apparatus by a client PC, the client PC generates, when obtaining a distributed printing request of a print job being printed by the first print apparatus from the second print apparatus based on a user operation performed on the second print apparatus, a first distributed printing job for causing the first print apparatus to print a first portion of an unprinted portion of a print job and a second distributed printing job for causing the second print apparatus to print a second portion of the unprinted portion.

8 Claims, 14 Drawing Sheets ns of print apparatuses 2, and a network NW
PRINT SYSTEM, PRINT CONTROL APPARATUS, AND STORAGE MEDIUM FOR CONTROLLING PRINT CONTROL APPARATUS The present application is based on, and claims priority from JP Application Serial Number 2019-094204, filed May 20, 2019, the disclosure of which is hereby incorporated by reference herein in its entirety.

BACKGROUND

1. Technical Field

The present disclosure relates to a print system, a print control apparatus, and a storage medium for controlling the print control apparatus.

2. Related Art

JP-A-2007-030354 discloses a print system including a first print apparatus, a second print apparatus, and a print control apparatus. In this print system, when a user specifies the second print apparatus as a destination of distributed printing of a print job using the first print apparatus before start of printing of the print job, the print control apparatus divides the print job into two distributed printing jobs to be transmitted to the first and second print apparatuses which perform printing of the respective distributed printing jobs.

According to the technique disclosed in JP-A-2007-030354, distributed printing is instructed by specifying print apparatuses of destinations of the distributed printing before start of printing of a print job, and the distributed printing may not be instructed during printing of the print job.

SUMMARY

According to an aspect of the present disclosure, a print system controls first and second print apparatuses by a print control apparatus. The print control apparatus generates a first distributed printing job for causing the first print apparatus to print a first portion in an unprinted portion of a print job and a second distributed printing job for causing the second print apparatus to print a second portion in the unprinted portion when obtaining a request for performing distributed printing of the print job being printed by the first print apparatus from the second print apparatus based on a user operation performed on the second print apparatus.

According to another aspect of the present disclosure, a print control apparatus controlling a first print apparatus and a second print apparatus includes an obtaining section configured to obtain a distributed printing request of a print job being printed by the first print apparatus from the second print apparatus based on a user operation performed on the second print apparatus and a controller configured to generate a first distributed printing job for causing the first print apparatus to print a first portion of an unprinted portion of the print job and a second distributed printing job for causing the second print apparatus to print a second portion of the unprinted portion when the distributed printing request is obtained from the second print apparatus.

According to a further aspect of the present disclosure, a non-transitory computer-readable storage medium stores a program that causes a print control apparatus controlling a first print apparatus and a second print apparatus to execute obtaining a distributed printing request of a print job being printed by the first print apparatus from the second print apparatus based on a user operation performed on the second print apparatus, and generating, when the distributed printing request is obtained from the second print apparatus, a first distributed printing job for causing the first print apparatus to print a first portion of an unprinted portion of the print job and a second distributed printing job for causing the second print apparatus to print a second portion of the unprinted portion.

According to a still further aspect of the present disclosure, a method for controlling a print control apparatus controlling a first print apparatus and a second print apparatus includes obtaining a distributed printing request of a print job being printed by the first print apparatus from the second print apparatus based on a user operation performed on the second print apparatus, and generating a first distributed printing job for causing the first print apparatus to print a first portion of an unprinted portion of the print job and a second distributed printing job for causing the second print apparatus to print a second portion of the unprinted portion when the distributed printing request is obtained from the second print apparatus.

DESCRIPTION OF EXEMPLARY EMBODIMENTS

First Embodiment

Figure 1:
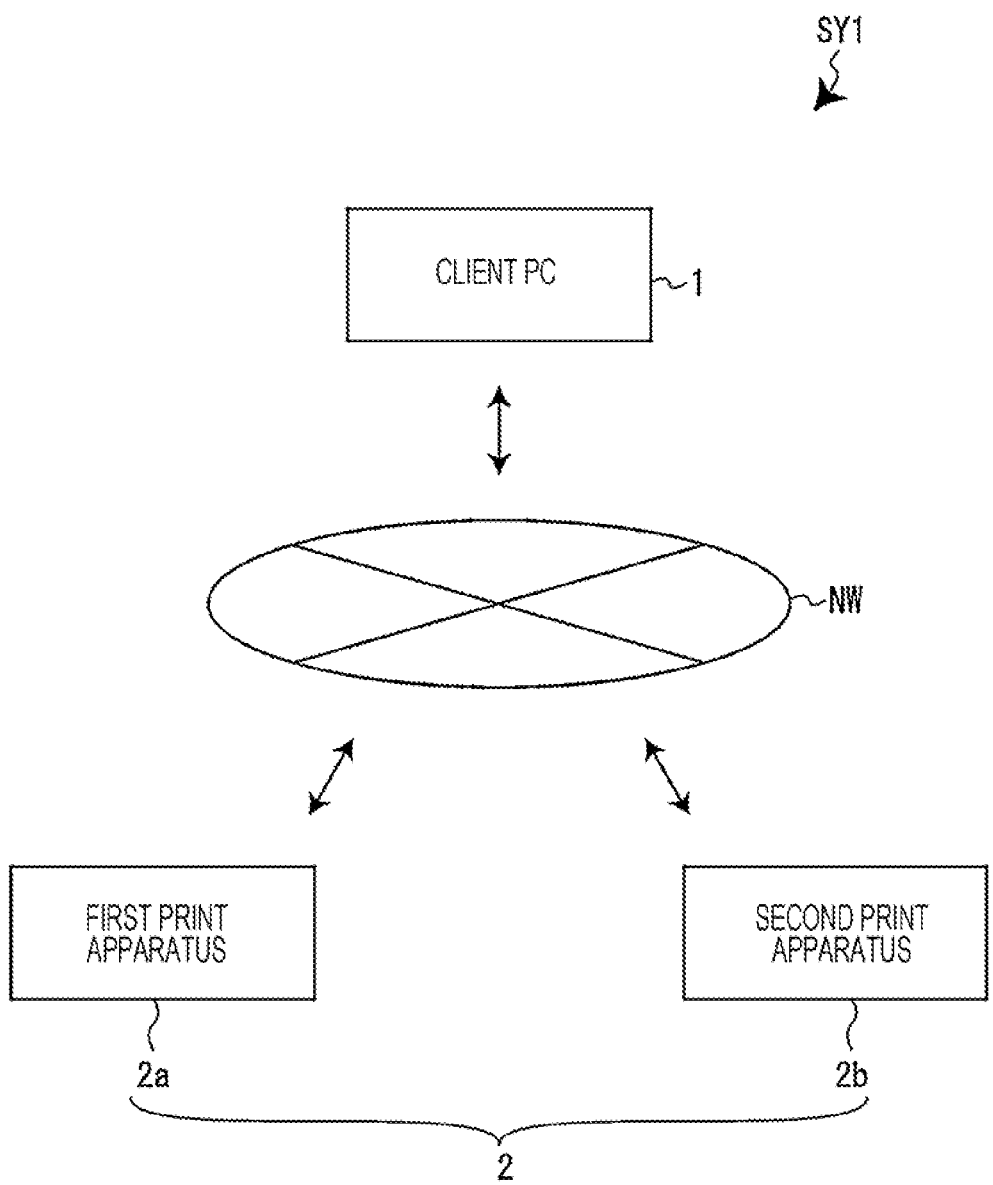
FIG. 1 is a diagram illustrating a configuration of a first print system.

Hereinafter, a print system, a print control apparatus, a storage medium, and a method for controlling the print control apparatus according to an embodiment will be described with reference to the accompanying drawings. FIG. 1 is a diagram illustrating a configuration of a first print system SY1 according to a first embodiment. The first print system SY1 includes at least one client personal computer (PC) 1, a plurality of print apparatuses 2, and a network NW which connects the client PC 1 and the print apparatuses 2 to one another. The client PC 1 is an example of the "print control apparatus".

In FIG. 1, the first print system SY1 includes a single client PC 1 and two print apparatuses 2. One of the two print apparatuses 2 is a first print apparatus 2a and the other is a second print apparatus 2b. Note that a local area network (LAN) or the Internet communication network, for example, may be employed as the network NW.

The first print system SY1 supports an authentication printing function. The client PC 1 generates a print job to be stored in the client PC 1. On the other hand, each of the print apparatuses 2 obtains login information based on a login operation performed by the user and transmits the obtained login information to the client PC 1. The login operation is performed when a card reader 23 (refer to FIG. 3) reads an authentication card or when a user ID and a password are input to an operation panel 24 (refer to FIG. 3).

The client PC 1 performs user authentication based on the login information transmitted from one of the print apparatuses 2, and transmits a print job list 31 (refer to FIG. 4) of an authenticated user to the print apparatus 2 when the user authentication is successfully performed. The print apparatus 2 displays the print job list 31 transmitted from the client PC 1 for the user and receives a selection of a print job. The print apparatus 2 requests transmission of a selected print job to the client PC 1 and performs printing based on the print job transmitted from the client PC 1.

Furthermore, the first print system SY1 according to this embodiment supports a distributed printing function. The term "distributed printing function" indicates printing of a print job distributed to the plurality of print apparatuses 2. One of the print apparatuses 2 according to this embodiment may request the distributed printing of a print job being printed in the other of the print apparatuses 2.

For example, when printing of a print job "job a" is performed in the first print apparatus 2a, the user selects the print job "job a" in the print job list 31 in the second print apparatus 2b, and when print execution is instructed, the client PC 1 generates a first distributed printing job including a first portion of an unprinted portion of the print job "job a" and a second distributed printing job including a second portion of the print job "job a". Thereafter, the client PC 1 transmits the first distributed printing job to the first print apparatus 2a and second distributed printing job to the second print apparatus 2b. In this way, in the first print system SY1, the distributed printing may be instructed during printing of a print job.

Note that the print job "job a" is simply referred to as "job a" hereinafter. Furthermore, printing of a single print job by a single print apparatus 2 is referred to as "normal printing" which is different from the "distributed printing" indicating printing of a single print job by a plurality of print apparatuses 2.

Figure 2:
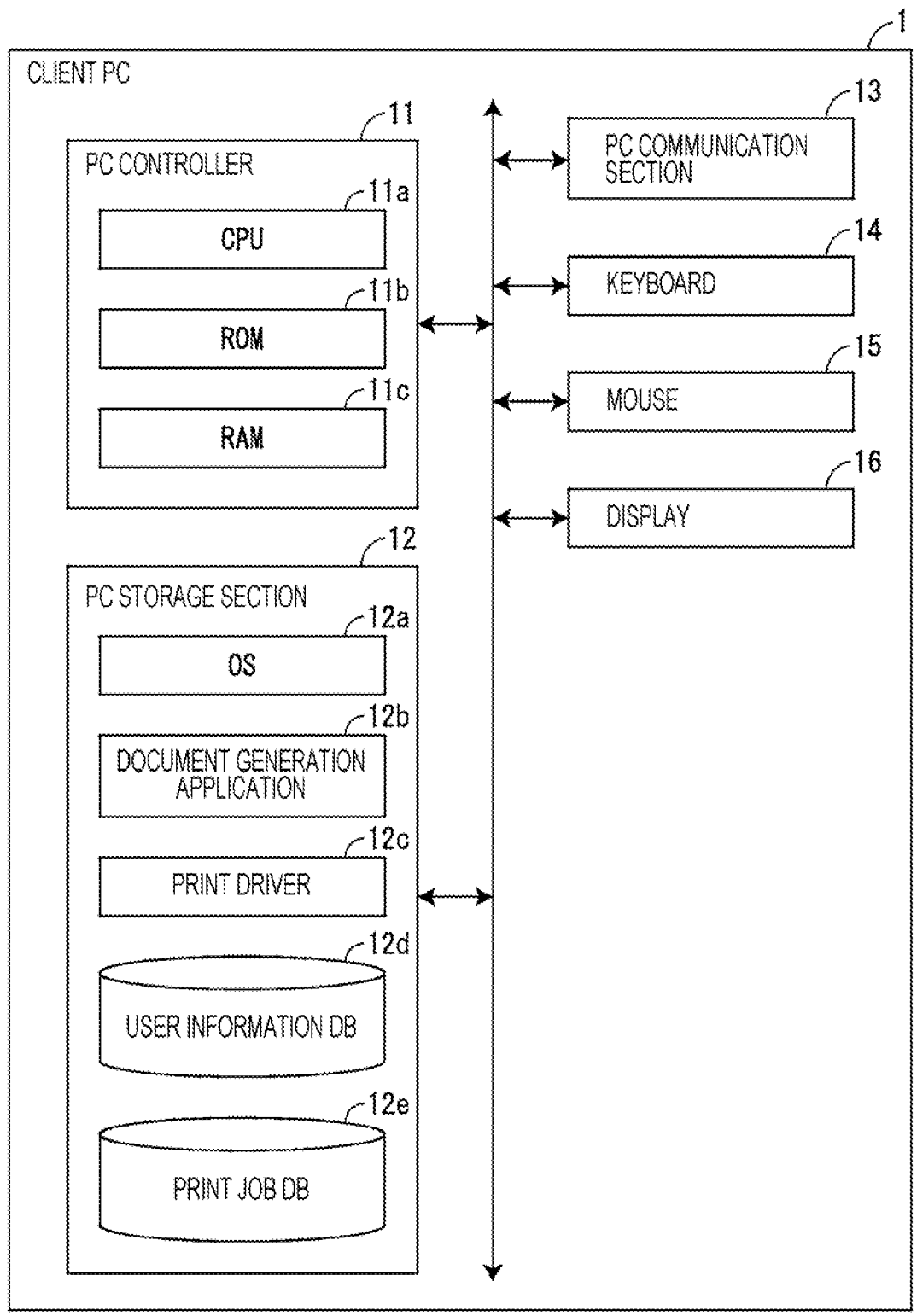
FIG. 2 is a block diagram illustrating a hardware configuration of a client PC.

FIG. 2 is a block diagram illustrating a hardware configuration of the client PC. The client PC 1 includes a PC controller 11, a PC storage section 12, a PC communication section 13, a keyboard 14, a mouse 15, and a display 16. The PC controller 11 is an example of an "obtaining section" and a "controller".

The PC controller 11 includes a central processing unit (CPU) 11a, a read only memory (ROM) 11b, and a random access memory (RAM) 11c. The CPU 11a develops a control program stored in the ROM 11b in the RAM 11c so as to control the sections included in the client PC 1.

Note that the PC controller 11 may include another processor instead of the CPU 11a. The processor may be configured by a hardware circuit, such as an application specific integrated circuit (ASIC). Furthermore, the processor may be configured by at least one CPU and a hardware circuit, such as an ASIC, operated in cooperation.

The PC storage section 12 is a hard disk drive (HDD), for example, and stores an operating system (OS) 12a, a document generation application 12b, a print driver 12c, a user information database 12d, and a print job database 12e. The print driver 12c is an example of a "program".

The OS 12a is basic software which operates various application programs. The document generation application 12b is an application program which generates a document to be printed. Note that a print target may be an image instead of a document, and in this case, an image generation application is used.

The print driver 12c is a control program which performs print control of the print apparatuses 2, such as generation of a print job in a command system readable by the print apparatuses 2. The PC controller 11 controls the distributed printing based on the print driver 12c. Furthermore, the PC controller 11 adds identifying information for identifying a user to a print job based on the print driver 12c. The authentication printing function described above may be realized when the identifying information is added to a print job.

The user information database 12d stores user information for user authentication. The user information is configured by associating the identifying information added to a print job, a card ID used for authentication of a user who uses the card reader 23 (refer to FIG. 3), and a user ID and a password which are used for the user authentication using the operation panel 24 with one another.

The print job database 12e stores a print job generated by the client PC 1. As a print job stored in the print job database 12e, a job name which is a name of the print job, identifying information for identifying a user, and information indicating a print state of the print job which are associated with one another are stored. The print state indicates whether a target print job is in a "printing" state, a "before printing" state, or an "end of printing".

The PC controller 11 obtains login information from the print apparatuses 2, and when the user authentication is successfully performed, the PC controller 11 generates the print job list 31 for the user and transmits the generated print job list 31 to the print apparatuses 2. Furthermore, when a request for printing a print job is transmitted from the print apparatuses 2, the PC controller 11 reads the requested print job from the print job database 12e and transmits the read print job to the print apparatuses 2.

The PC communication section 13 communicates with the print apparatuses 2 through the network NW. The keyboard 14 and the mouse 15 are used by the user to perform various operations, such as a generation of a print job and a print instruction. Note that the PC controller 11 determines that pull printing has been instructed when the instruction for printing a print job is issued, and stores the print job in the print job database 12e. The display 16 displays various information, such as a document editing screen (not illustrated) of the document generation application 12b and a print instruction screen (not illustrated) of the print driver 12c.

Figure 3:
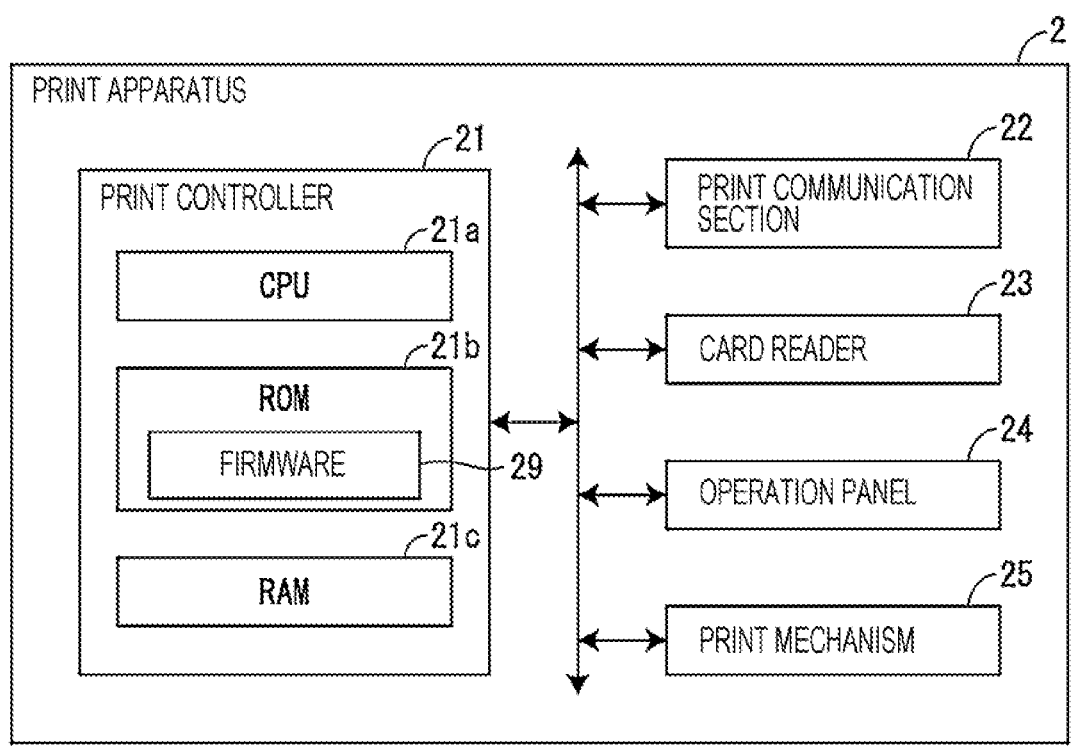
FIG. 3 is a block diagram illustrating a hardware configuration of a print apparatus.

FIG. 3 is a block diagram illustrating a hardware configuration of the print apparatuses 2. Each of the print apparatuses 2 includes a print controller 21, a print apparatus communication section 22, a card reader 23, an operation panel 24, and a print mechanism 25. Note that the first and second print apparatuses 2a and 2b have the same hardware configuration.

The print controller 21 includes a CPU 21a, a ROM 21b, and a RAM 21c. The ROM 21b stores firmware 29. The CPU 21a develops a control program, such as the firmware 29, stored in the ROM 21b in the RAM 21c so as to control the sections included in the print apparatus 2.

Note that the print controller 21 may include another processor instead of the CPU 21a. The processor may be configured by a hardware circuit, such as an ASIC. Furthermore, the processor may be configured by at least one CPU and a hardware circuit, such as an ASIC, operated in cooperation.

The print apparatus communication section 22 communicates with the client PC 1 through the network NW. The card reader 23 reads an authentication card so as to obtain a card ID recorded in the authentication card.

The operation panel 24 receives various operations performed by the user while displaying various information. For example, the operation panel 24 displays a print job list screen D (refer to FIG. 4) and receives an operation of selecting a print job and an operation of instructing printing. Furthermore, the operation panel 24 displays a login screen (not illustrated) and receives inputs of a user ID and a password.

Note that, when causing the card reader 23 to read an authentication card as a login operation performed by the user, the print controller 21 transmits a card ID to the client PC 1 as login information. Furthermore, when a user ID and a password are input to the operation panel 24 as a login operation performed by the user, the print controller 21 transmits the user ID and the password to the client PC 1 as login information. Furthermore, when the client PC 1 successfully performs the user authentication after the login information is transmitted to the client PC 1, the print controller 21 receives a print operation.

The print mechanism 25 is a printer engine which performs printing on a print medium, such as a copy sheet. When an ink jet method is employed, for example, the print mechanism 25 includes an ink jet head, a head driving mechanism, and a print medium transport mechanism. On the other hand, when an electrophotographic method is employed, for example, the print mechanism 25 includes a laser light source, a transfer mechanism, and a print medium transport mechanism.

Figure 4:
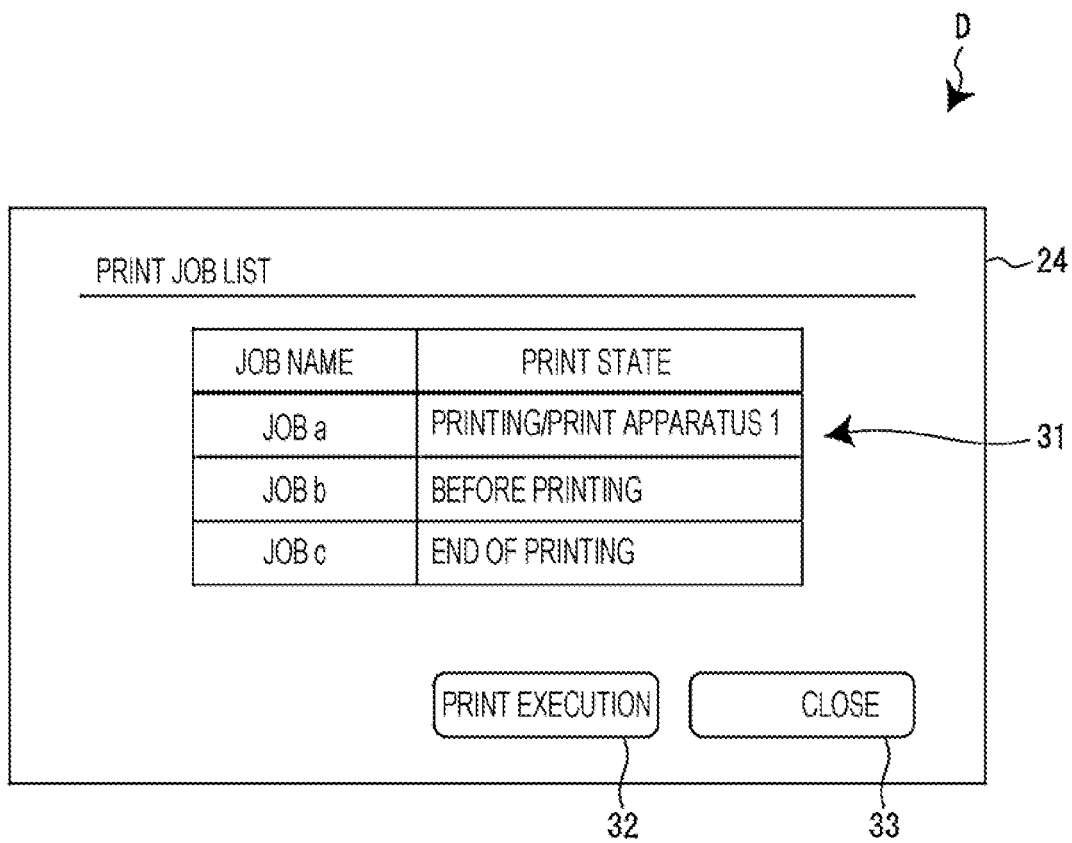
FIG. 4 is a diagram illustrating an example of display of a print job list screen.

Next, a print job list screen D will be described with reference to FIG. 4. FIG. 4 is a diagram illustrating an example of the print job list screen D displayed in the operation panel 24 of the second print apparatus 2b.

As illustrated in FIG. 4, the print job list screen D displays a print job list 31, a print execution button 32, and a close button 33. The print job list 31 is generated by listing job names of print jobs to which identifying information for identifying users who login to the print apparatus 2 is added among print jobs stored in the print job database 12e of the client PC 1.

The print job list 31 displays the job names and print states which are associated with each other. In columns of the print state, when the print state is "printing", a name of a print apparatus being printing a print job is also displayed. A "print apparatus 1" displayed in a first row of the print job list 31 in FIG. 4 is a name of the first print apparatus 2a. Specifically, the first row of the print job list 31 in FIG. 4 indicates that a "job a" is being printed by the first print apparatus 2a.

The second print apparatus 2b requests the client PC 1 to perform distributed printing of the "job a" when the user selects the "job a" and selects the print execution button 32 in the state illustrated in FIG. 4. In this case, the "job a" is subjected to the distributed printing using the first and second print apparatuses 2a and 2b. Furthermore, the second print apparatus 2b requests the client PC 1 to perform normal printing of a "job b" or a "job c" when the user selects the "job b" or the "job c" and selects the print execution button 32 in the state illustrated in FIG. 4. In this case, the "job b" or the "job c" are subjected to the normal printing by the second print apparatus 2b. Furthermore, the second print apparatus 2b closes the print job list screen D when the user selects the close button 33 in the state illustrated in FIG. 4.

Figure 5:
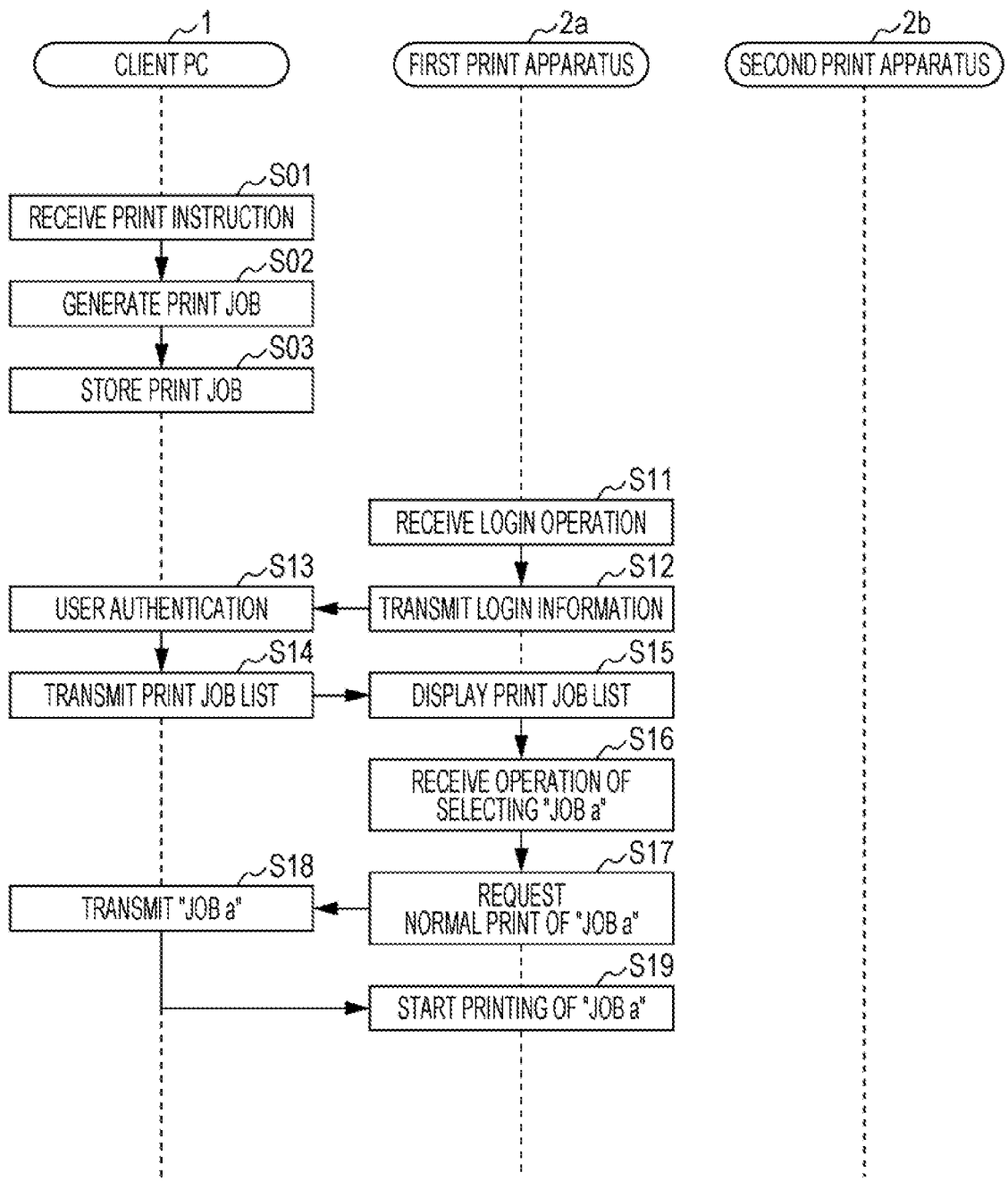
FIG. 5 is a flowchart of a flow of a print process.
Figure 6:
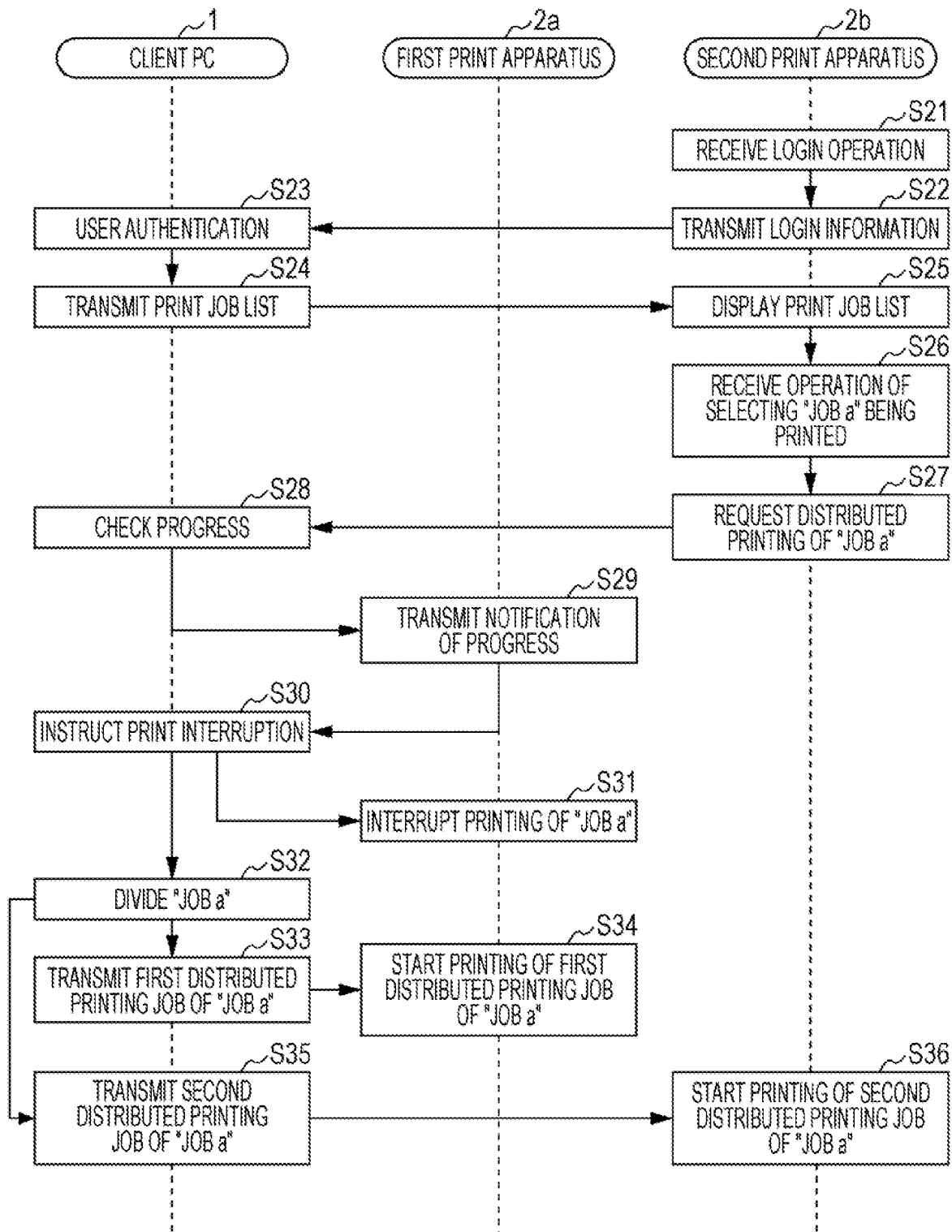
FIG. 6 is a flowchart of a flow of the print process following the flowchart of FIG. 6.

Next, a print process performed by the first print system SY1 will be described with reference to flowcharts of FIGS. 5 and 6. Processes performed by the client PC 1 in FIGS. 5 and 6 are mainly realized when the PC controller 11 executes the print driver 12c. The print process includes a print job storing process of storing a print job, a normal printing process of performing normal printing of a print job, and a distributed printing process of performing distributed printing of a print job.

First, a flow of the print job storing process will be described. When receiving an instruction for printing a document generated by the document generation application 12b from the user (S01), the client PC 1 generates a print job (S02). In this case, the client PC 1 adds a job name and identifying information for identifying the user to the print job. The client PC 1 stores the generated print job in the print job database 12e (S03). The process from step S01 to step S03 described above corresponds to the print job storing process.

Subsequently, a flow of the normal printing process will be described. When receiving a login operation performed by the user by the card reader 23 or the operation panel 24 (S11), the first print apparatus 2a transmits the login information obtained by the login operation to the client PC 1 (S12). The client PC 1 compares the login information transmitted from the first print apparatus 2a with user information stored in the user information database 12d so as to perform user authentication (S13).

When successfully performing the user authentication, the client PC 1 transmits the print job list 31 which is a list of print jobs to which identifying information associated with the login information transmitted from the first print apparatus 2a is added among print jobs stored in the print job database 12e to the first print apparatus 2a (S14). The first print apparatus 2a displays the transmitted print job list 31 in the print job list screen D (S15).

Note that the client PC 1 may perform the user authentication and transmit a result of the authentication to the first print apparatus 2a, and thereafter, obtain a request of the print job list 31 from the first print apparatus 2a before transmitting the print job list 31 to the first print apparatus 2a.

When receiving an operation of selecting the "job a" in the print job list screen D (S16), the first print apparatus 2a requests the client PC 1 to perform the normal printing of the "job a" (S17). On the other hand, the client PC 1 reads the "job a" from the print job database 12e and transmits the read "job a" to the first print apparatus 2a (S18). The first print apparatus 2a starts printing of the "job a" transmitted from the client PC 1 (S19). The process from step S11 to step S19 described above corresponds to the normal printing process.

Subsequently, a flow of the distributed printing process will be described. It is assumed here that the printing of the "job a" is continuously performed by the first print apparatus 2a. As illustrated in FIG. 6, when receiving a login operation performed by the user using the card reader 23 or the operation panel 24 (S21), the second print apparatus 2b transmits the login information obtained by the login operation to the client PC 1 (S22). The client PC 1 compares the login information transmitted from the second print apparatus 2b with the user information stored in the user information database 12d so as to perform the user authentication (S23).

When successfully performing the user authentication, the client PC 1 transmits the print job list 31 which is a list of print jobs to which identifying information associated with the login information transmitted from the second print apparatus 2b is added among the print jobs stored in the print job database 12e to the second print apparatus 2b (S24). The second print apparatus 2b displays the transmitted print job list 31 in the print job list screen D (S25).

When receiving an operation of selecting the "job a" which is in the print state of "printing" in the print job list screen D (S26), the second print apparatus 2b requests the client PC 1 to perform the distributed printing of the "job a" (S27). When obtaining the request of the distributed printing of the "job a" from the second print apparatus 2b, the client PC 1 confirms with the first print apparatus 2a about progress of the "job a" (S28). The first print apparatus 2a notifies the client PC 1 of the progress in response to the confirmation of the progress of the "job a" (S29). When obtaining the notification indicating the progress, the client PC 1 instructs the first print apparatus 2a to interrupt the printing (S30). In response to the instruction, the first print apparatus 2a interrupts the printing of the "job a" (S31).

Note that when an unprinted portion of the "job a" is equal to or larger than one copy, the client PC 1 instructs interruption of the printing at a time when one copy being performed by the first print apparatus 2a at a time when the notification of the progress is supplied is terminated. Note that, when the "job a" corresponds to a print job of five copies of 10 pages and the first print apparatus 2a is performing the printing of a first page of a first copy to a 10th page of a fourth copy at the time when the notification of the progress is supplied, it is determined that the unprinted portion of the "job a" is equal to or larger than one copy. On the other hand, when an unprinted portion of the "job a" is smaller than one copy, the client PC 1 instructs interruption of the printing at a time when a page being printed by the first print apparatus 2a at a time when the notification of the progress is supplied is terminated.

After instructing the first print apparatus 2a to interrupt the printing, the client PC 1 divides the "job a" (S32). As described above, the client PC 1 divides the unprinted portion of the "job a" into a first distributed printing job to be processed by the first print apparatus 2a currently performing the printing and a second distributed printing job to be processed by the second print apparatus 2b which has received the distributed printing request.

Specifically, the client PC 1 divides the "job a" in a unit of copy when the unprinted portion of the "job a" is equal to or larger than two copies. For example, when the unprinted portion of the "job a" corresponds to two copies, the client PC 1 generates a first distributed printing job for printing one of the copies of the "job a" (corresponding to a first portion) and a second distributed printing job for printing the other of the copies of the "job a" (corresponding to a second portion). Furthermore, when the number of copies of the unprinted portion may not be evenly divided by the number of print apparatuses 2 which perform the distributed printing, a reminder obtained by dividing the number of copies of the unprinted portion by the number of print apparatuses 2 which perform the distributed printing is assigned to one of the distributed printing jobs.

Furthermore, the client PC 1 divides the "job a" in a unit of page when the unprinted portion of the "job a" is equal to or smaller than one copy. For example, when the unprinted portion of the "job a" corresponds to 10 pages, the client PC 1 generates a first distributed printing job for printing first to fifth pages of the "job a" and a second distributed printing job for printing a sixth to 10th pages of the "job a". Furthermore, when the number of pages of the unprinted portion may not be evenly divided by the number of print apparatuses 2 which perform the distributed printing, a reminder obtained by dividing the number of pages of the unprinted portion by the number of print apparatuses 2 which perform the distributed printing is assigned to one of the distributed printing jobs.

After dividing the "job a", the client PC 1 transmits the first divided printing job of the "job a" to the first print apparatus 2a (S33). The first print apparatus 2a starts printing of the first distributed printing job of the "job a" transmitted from the client PC 1 (S34). Furthermore, the client PC 1 transmits the second divided printing job of the "job a" to the second print apparatus 2b (S35). The second print apparatus 2b starts printing of the second distributed printing job of the "job a" transmitted from the client PC 1 (S36). The process from step S21 to step S36 described above corresponds to the distributed printing process.

Note that, although not illustrated, after transmitting the "job a" to the first print apparatus 2a (refer to S18 of FIG. 5), the client PC 1 updates the print state of the "job a" in the print job database 12e from "before printing" to "printing". Furthermore, when the printing is terminated after starting the printing of the distributed printing jobs (refer to S34 and S36 of FIG. 6), the first and second print apparatuses 2a and 2b transmit a notification indicating the end of the printing to the client PC 1. When receiving a notification indicating the end of the printing from all the print apparatuses 2 which perform the distributed printing, the client PC 1 updates the print state of the target print job in the print job database 12e from "printing" to "end of printing".

As described above, according to the first print system SY1 of this embodiment, when receiving the distributed printing request from the second print apparatus 2b about the print job being printed by the first print apparatus 2a, the client PC 1 divides an unprinted portion of the print job so as to generate first and second distributed printing jobs. With this configuration, the user may instruct the distributed printing during printing of a print job. Therefore, the user may cause a first print apparatus 2 to execute printing, and thereafter, login a second print apparatus 2 so as to cause the second print apparatus 2 to perform the distributed printing when the second print apparatus 2 is available. That is, the user may perform a resourceful operation.

Furthermore, the client PC 1 interrupts printing of a print job being printed by the first print apparatus 2a at an appropriate timing suitable for an unprinted portion when obtaining a distributed printing request from the second print apparatus 2b, and therefore, the client PC 1 may appropriately perform division into first and second distributed printing jobs. Specifically, when an unprinted portion of the print job is equal to or larger than two copies, the client PC 1 performs the division in a unit of copy, and therefore, a period of time required for the printing may be reduced and a burden of the user who arranges a printed matter printed by the first print apparatus 2a and a printed matter printed by the second print apparatus 2b after the distributed printing may be eliminated. Furthermore, when an unprinted portion of the print job is equal to or smaller than one copy, the client PC 1 performs the division in a unit of page, and therefore, a period of time required for the printing may be reduced.

Furthermore, the first and second print apparatuses 2a and 2b receive the printing operation when the user authentication is successfully performed, and therefore, a security effect may be expected. Furthermore, the second print apparatus 2b displays the print job list 31 which is a list of print jobs stored in association with logged-in users, and therefore, the user may execute the distributed printing by selecting a print job being printed by the first print apparatus 2a in the displayed print job list 31.

Note that the following modifications may be employed in the first embodiment.

Modification 1-1

Figure 7:
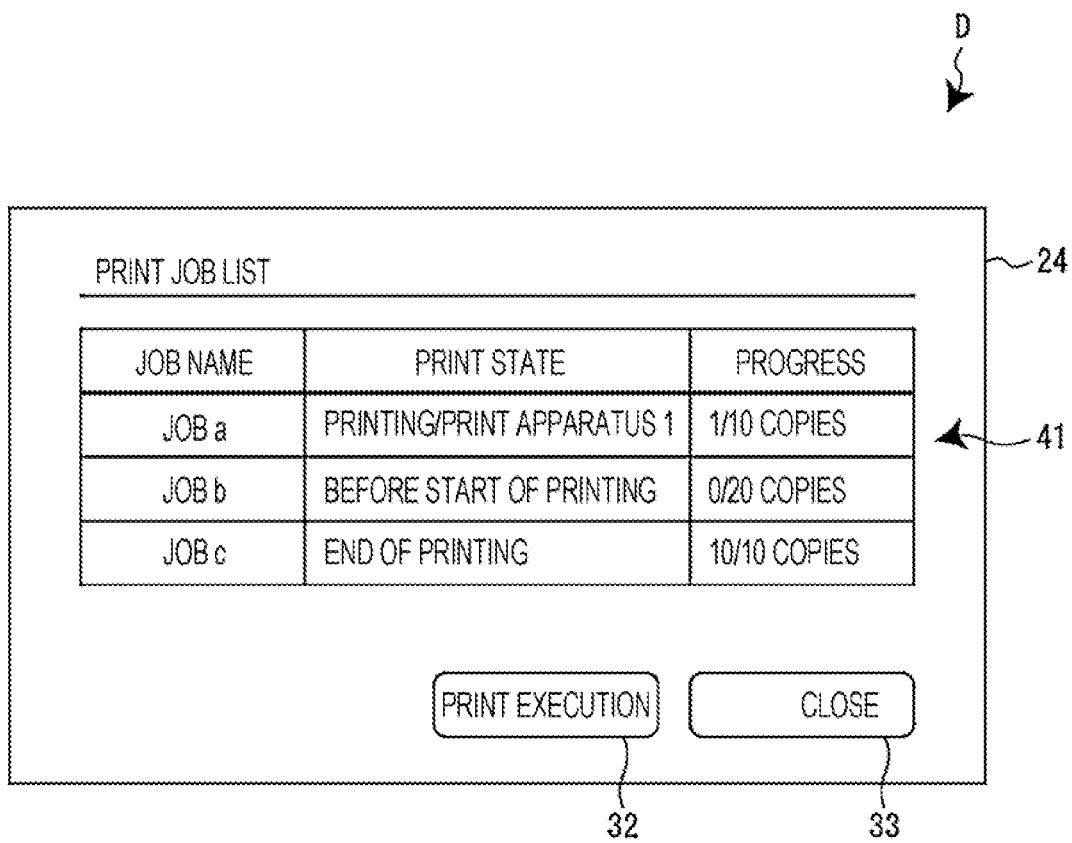
FIG. 7 is a diagram illustrating an example of display of a print job list screen according to a modification.

As illustrated in FIG. 7, a print job list 41 including progress may be displayed in the print job list screen D. A job name, a print state, and progress which are associated with each other are displayed in the print job list 41 of this modification. The progress is information indicating the number of copies which have been printed in the number of all copies of a print job. With this configuration, the user may select a print job to be subjected to the distributed printing with reference to the progress.

Note that, when the print state is "before printing" as illustrated in an example of the job name "job b" in the print job list 41 in FIG. 7, the progress represents "0 copies" as the number of printed copies. Furthermore, when the print state is "end of printing" as illustrated in an example of the job name "job c" in the print job list 41, the number of all copies is the same as the number of terminated copies as the progress. Furthermore, according to this embodiment, every time the print apparatus 2 being performing printing terminates the printing for one copy after starting the printing of a print job, the print apparatus 2 is required to notify the client PC 1 of information indicating the termination of the printing for one copy. Furthermore, when the progress is updated, the client PC 1 transmits the updated print job list 31 to the print apparatus 2.

Modification 1-2

Figure 8:
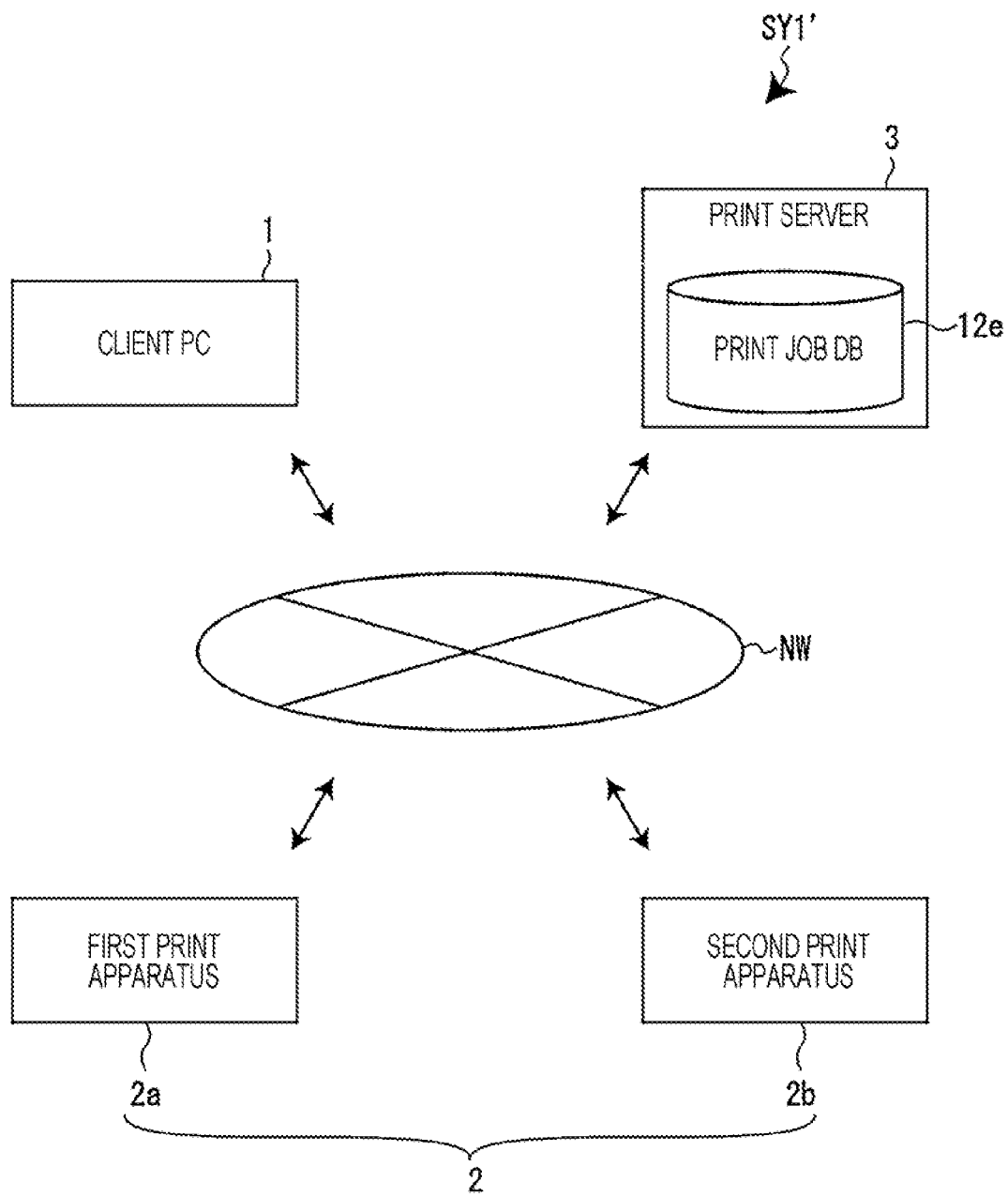
FIG. 8 is a diagram illustrating a configuration of a first print system according to the modification.

As illustrated in FIG. 8, a first print system SY1' including a print server 3 may be configured. The first print system SY1' includes at least one client PC 1, a plurality of print apparatuses 2, the print server 3, and a network NW which connect the client PC 1, the print apparatuses 2, and the print server 3 to one another. In this modification, the print server 3 is an example of a "print control apparatus".

According to this modification, the client PC 1 transmits a generated print job to the print server 3. The print server 3 includes a print job database 12e and stores the print job transmitted from the client PC 1 in the print job database 12e. Thereafter, the processes in the normal printing process and the distributed printing process performed by the client PC 1 in the first embodiment are performed by the print server 3. In this way, according to the modification, since the print server 3 may control the distributed printing, a load of the client PC 1 caused by the control may be reduced.

Modification 1-3

Although the distributed printing using the two print apparatuses 2 is illustrated in the foregoing embodiment, the distributed printing may be performed using three or more print apparatuses 2. In this case, by dividing the number of copies or the number of pages of an unprinted portion of a print job by the number of print apparatuses 2 performing the distributed printing, the numbers of copies or the numbers of pages to be included in first and second distributed printing jobs may be determined.

Modification 1-4

Division of a print job may be performed in the following method. It is assumed here that the first print apparatus 2a performs printing of print job for printing a plurality of copies. When obtaining a distributed printing request from the second print apparatus 2b, the client PC 1 divides an unprinted portion of the print job being printed by the first print apparatus 2a into a first distributed printing job and a second distributed printing job in a unit of page. On the other hand, when obtaining a distributed printing request from a third print apparatus which is different from the first and second print apparatuses 2a and 2b after the printing of the first distributed printing job is started by the first print apparatus 2a, the client PC 1 divides an unprinted portion of the first distributed printing job into a third distributed printing job to be printed by the first print apparatus 2a and a fourth distributed printing job to be printed by the third print apparatus in a unit of copy.

For example, when obtaining the distributed printing request when printing of a fourth page of a second copy is terminated by the first print apparatus 2a during printing of a print job of five copies of 10 pages, the client PC 1 divides a print job for the remaining three copies and six pages, that is, 36 pages, in a unit of page. For example, 18 pages including a fifth page of the second copy to a second page of a fourth copy is determined as a first distributed printing job and 18 pages including a 10th page of the fourth copy to a 10th page of the fifth copy is determined as a second distributed printing job. Furthermore, when obtaining a distributed printing request from the third print apparatus when printing of an eighth page of the second copy performed by the first print apparatus 2 is terminated, the client PC 1 divides a print job for the remaining 14 pages of the first print apparatus 2a in a unit of copy. For example, a ninth page and a 10th page of the second copy which are the remaining pages and a first page and a second page of the fourth copy which are the remaining pages are determined as a third distributed printing job and all the 10 pages of the second copy is determined as a fourth distributed printing job.

With this configuration, when a plurality of copies are to be printed by the distributed printing using two print apparatuses 2, printed matters printed by the individual print apparatuses 2 are merely stacked on each other, and therefore, the distributed printing may be performed on a job by dividing the job in a unit of page so that a printing time is efficiently reduced. On the other hand, when the distributed printing is performed using three print apparatuses 2, it is difficult to collect printed matters printed by the individual print apparatuses 2 in appropriate order, and therefore, the division may be performed in a unit of copy taking easiness of collection in appropriate order into consideration.

Modification 1-5

Although the user authentication is performed in the foregoing embodiments, the user authentication may not be performed. In this case, the print apparatuses 2 may display the print job list 31 including all the print jobs stored in the print job database 12e of the client PC 1 which are selectable for the user.

Modification 1-6

Although the print job list screen D is displayed in the operation panel 24 according to the first embodiment described above, the print job list 31 may be presented for the user in a method other than the display. For example, the print jobs included in the print job list 31 may be read by audio guidance, or the print job list 31 may be transmitted to a smartphone of the user.

Second Embodiment

Next, a second embodiment will be described. Although a client PC 1 controls the distributed printing in the first embodiment, print apparatuses 2 control distributed printing according to this embodiment. Hereinafter, portions which are different from the first embodiment will be mainly described. Note that components the same as the first embodiment are denoted by reference numerals the same as the first embodiment, and detailed descriptions thereof are omitted. Furthermore, the modifications employed in the components which are the same as the first embodiment are similarly employed in this embodiment.

Figure 9:
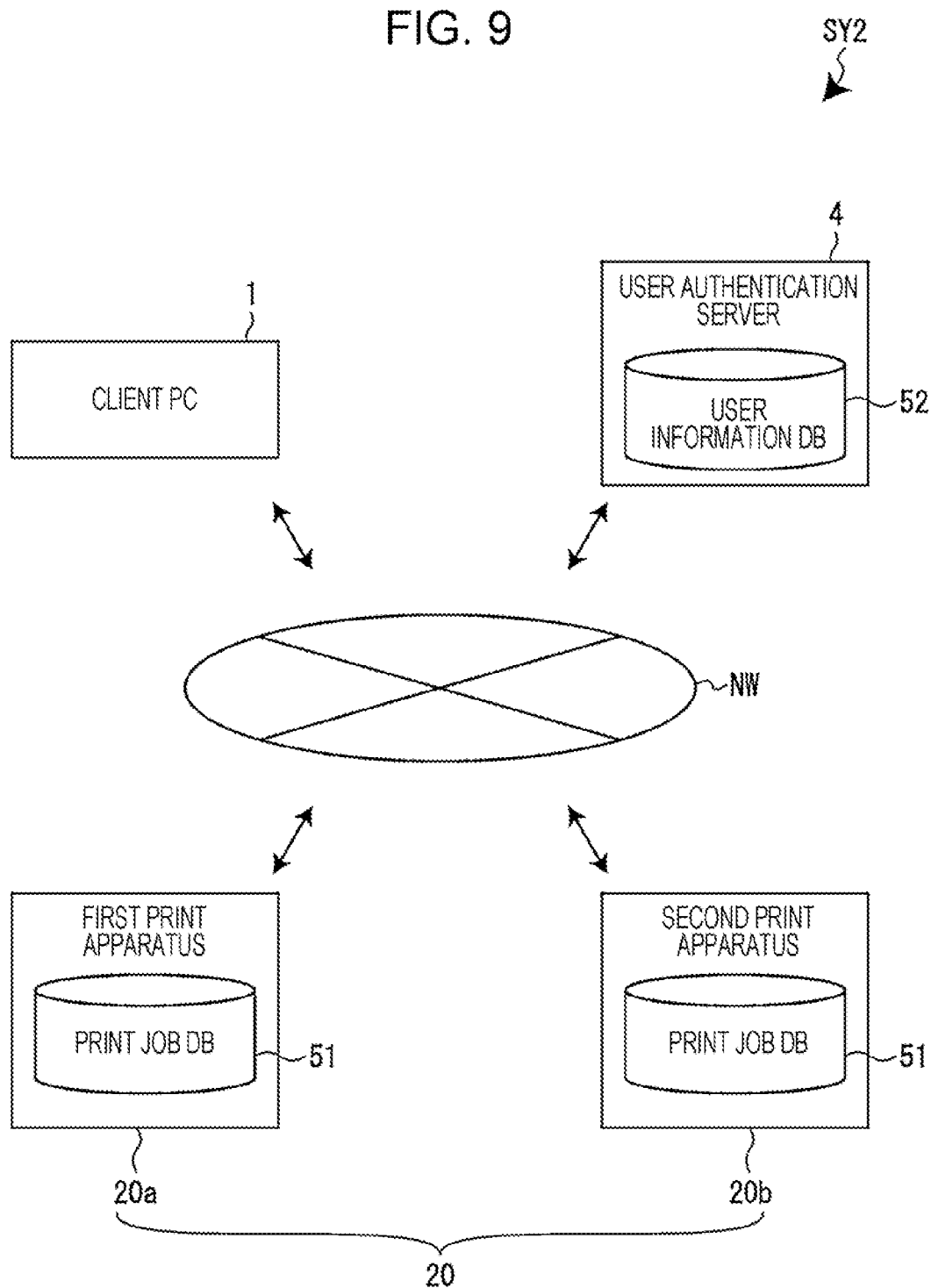
FIG. 9 is a diagram illustrating a configuration of a second print system according to a second embodiment.

FIG. 9 is a diagram illustrating a configuration of a second print system SY2 according to the second embodiment. The second print system SY2 includes at least one client PC 1, a plurality of print apparatuses 20, a user authentication server 4, and a network NW which connect the client PC 1, the print apparatuses 20, and the user authentication server 4 to one another. The plurality of print apparatuses 20 include a first print apparatus 20a and a second print apparatus 20b. In this embodiment, the first print apparatus 20a is an example of a "print control apparatus". Furthermore, a print controller 21 of the first print apparatus 20a is an example of an "obtaining section" and a "controller".

Furthermore, each of the print apparatuses 20 of this embodiment includes a print job database 51 storing print jobs in a ROM 21b or the like. Furthermore, the client PC 1 of this embodiment transmits a generated print job to a specified one of the print apparatuses 20. One of the print apparatuses 20 stores the print job transmitted from the client PC 1 in the print job database 51. Information stored in the print job database 51 is the same as that of the first embodiment. Note that the print apparatus 20 stores a print job list 31 in a RAM 21c or the like.

The user authentication server 4 is used to perform the user authentication and includes a user information database 52. The information stored in the user information database 52 is the same as that of the first embodiment.

Figure 10:
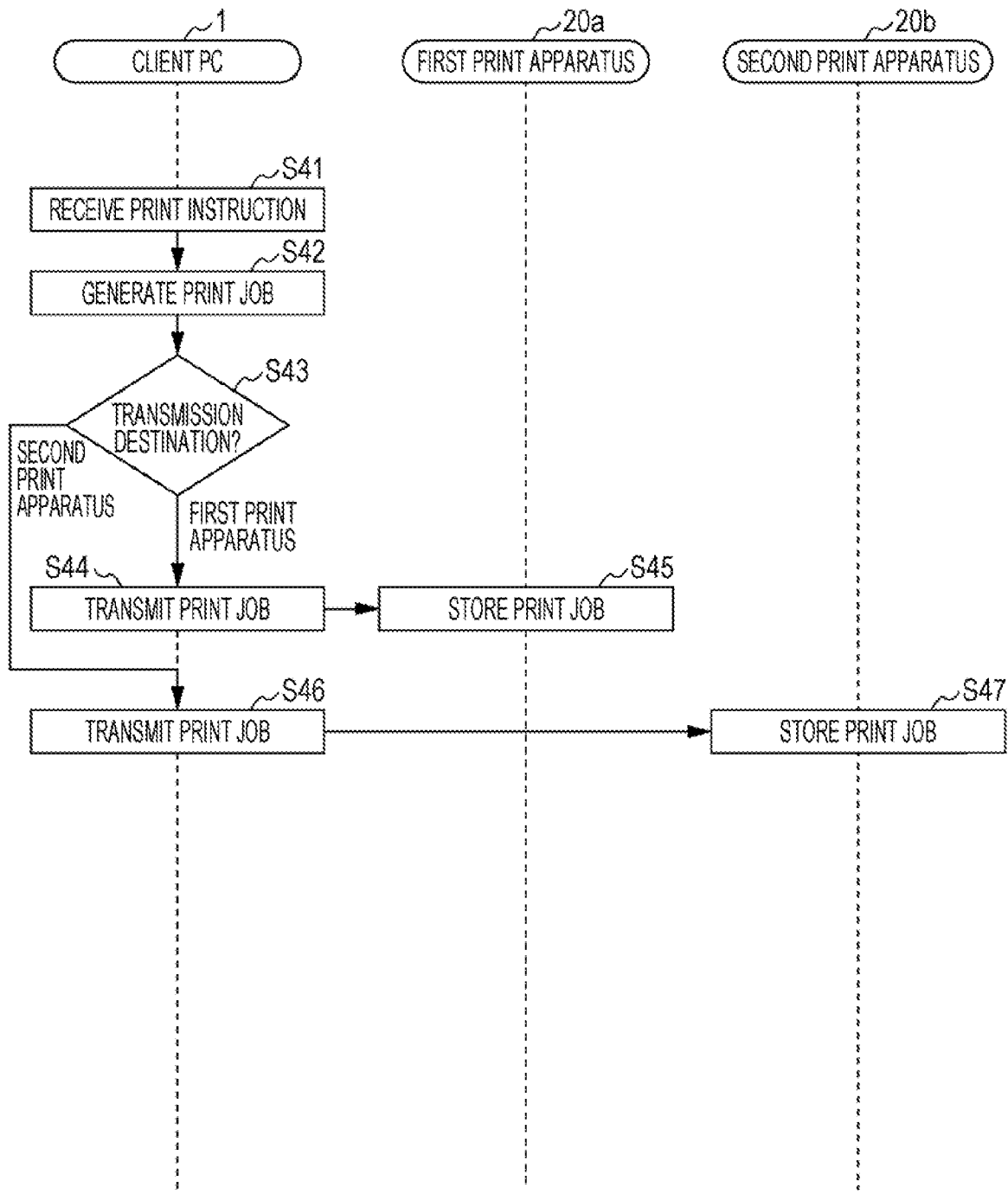
FIG. 10 is a flowchart of a flow of a print process according to the second embodiment.
Figure 11:
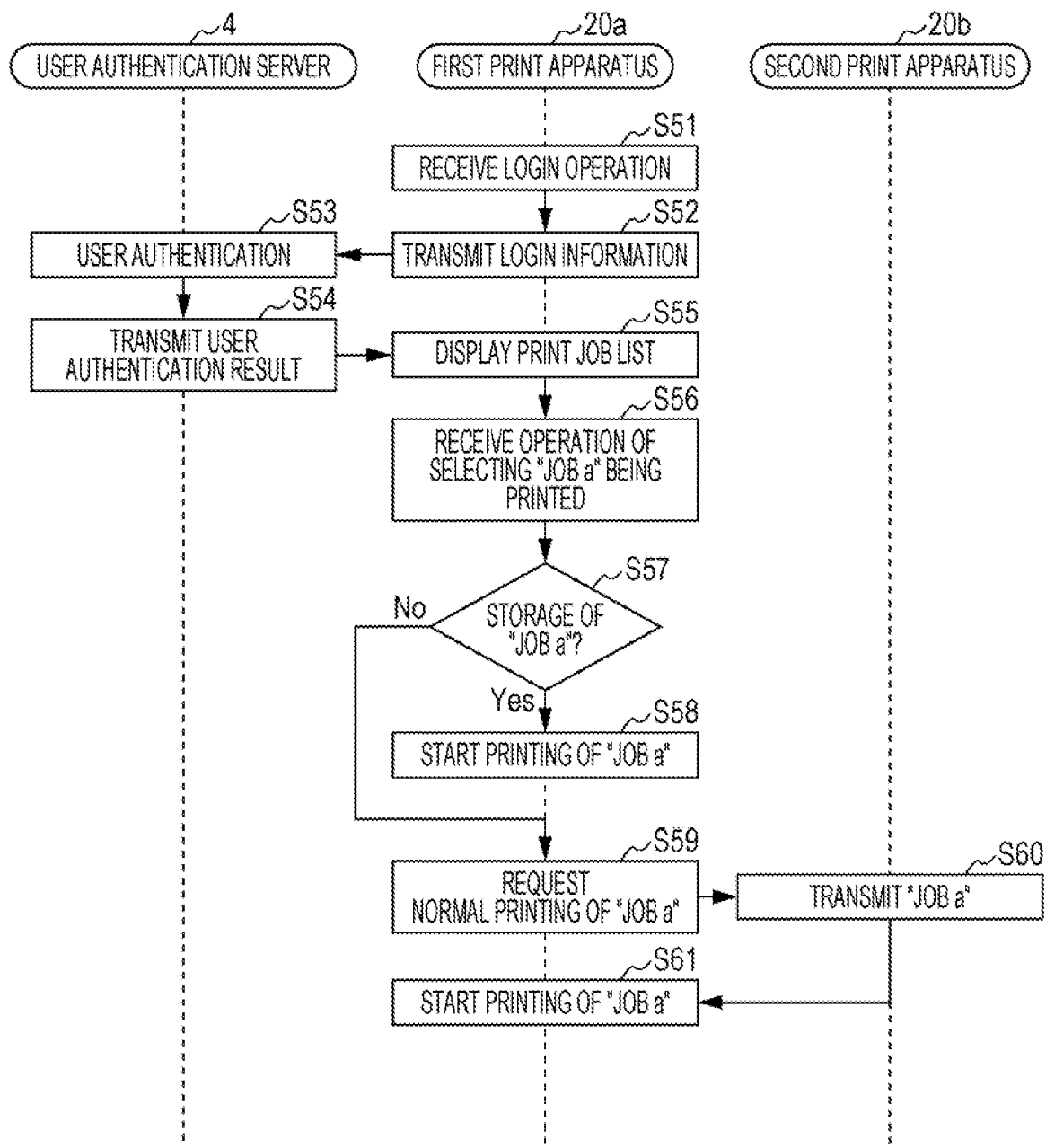
FIG. 11 is a flowchart of a flow of the print process following the flowchart of FIG. 10.
Figure 12:
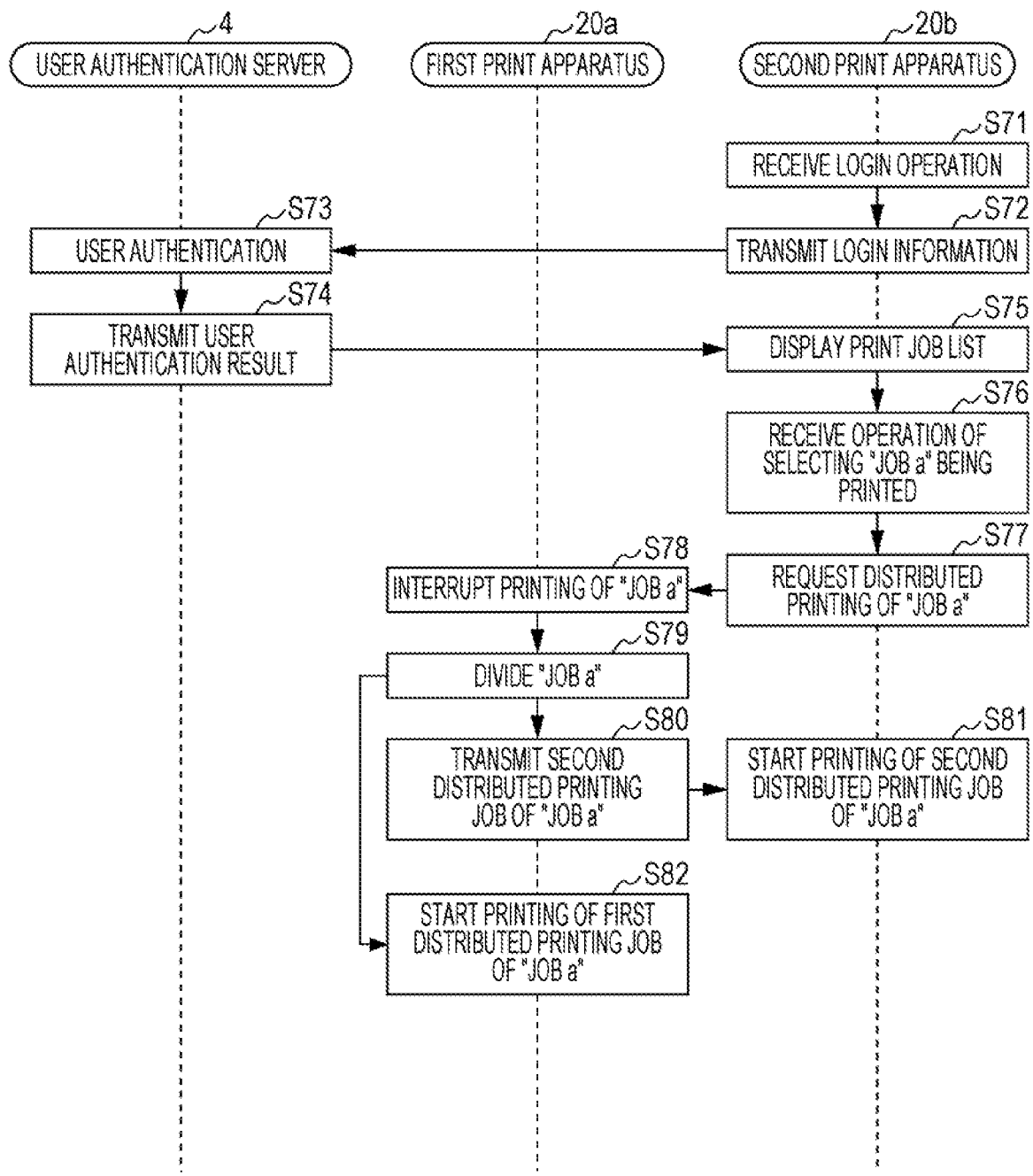
FIG. 12 is a flowchart of a flow of the print process following the flowchart of FIG. 11.

Next, a flow of a print process performed by the second print system SY2 will be described with reference to flowcharts of FIGS. 10 to 12. Individual processes performed by the print apparatuses 20 illustrated in FIGS. 10 to 12 are realized when the print controller 21 executes firmware 29 included in the ROM 21b. In this embodiment, the firmware 29 is an example of a "program".

Note that, in this embodiment, each of the print apparatuses 20 transmits a job name of a print job and identifying information to the other one of the print apparatuses 20 included in the second print system SY2 when receiving the print job. The other print apparatus 20 adds the job name and the identifying information to the print job list 31 included in the print apparatus 20 itself. Furthermore, each of the print apparatuses 20 transmits information on start and end of printing of the print job to the other of the print apparatuses 20 when the printing of the print job is started and terminated. When obtaining a notification indicating the start of the printing of the print job or the termination of the printing of the print job, the other of the print apparatuses 20 updates a print state of the print job included in the print job list 31.

Note that the flow of the print process is divided into a print job storing process, a normal printing process, and a distributed printing process also in this embodiment. First, a flow of the print job storing process will be described. As illustrated in FIG. 10, when receiving an instruction for printing a document generated by the document generation application 12b from the user (S41), the client PC 1 generates a print job (S42). The client PC 1 determines a transmission destination of the generated print job (S43). When determining that the transmission destination of the print job is the first print apparatus 20a (S43: first print apparatus), the client PC 1 transmits the print job to the first print apparatus 20a (S44). The first print apparatus 20a stores the print job transmitted from the client PC 1 in the print job database 51 included therein (S45).

Furthermore, when determining that the transmission destination of the print job is the second print apparatus 20b (S43: second print apparatus), the client PC 1 transmits the print job to the second print apparatus 20b (S46). The second print apparatus 20b stores the print job transmitted from the client PC 1 in the print job database 51 included therein (S47). The process from step S41 to step S47 described above corresponds to the print job storing process.

Subsequently, a flow of the normal printing process will be described. As illustrated in FIG. 11, when receiving a login operation performed by the user on the card reader 23 or the operation panel 24 (S51), the first print apparatus 20a transmits login information obtained by the login operation to the user authentication server 4 (S52). The user authentication server 4 compares the login information transmitted from the first print apparatus 20a with user information stored in the user information database 52 so as to perform the user authentication (S53).

The user authentication server 4 transmits a result of the user authentication to the first print apparatus 20a (S54). When the user authentication is successfully performed, the user authentication server 4 transmits identifying information for identifying the user along with a result of the authentication. The first print apparatus 20a displays the print job list 31 which is a list of print jobs to which identifying information is added among print job lists 31 stored in the RAM 21c in the print job list screen D based on the identifying information transmitted from the user authentication server 4 (S55).

Note that the user authentication server 4 may not transmit the identifying information to the first print apparatus 20a but a correspondence table in which login information and identifying information are associated with each other may be stored in the ROMs 21b of the first and second print apparatuses 20a and 20b. In this case, when obtaining an authentication result indicating successful authentication from the user authentication server 4 in step S55, the first print apparatus 20a displays the print job list 31 which is a list of print jobs to which identifying information corresponding to login information is added among print job lists 31 stored in the RAM 21c in the print job list screen D.

When receiving an operation of selecting a "job a" in the print job list screen D (S56), the first print apparatus 20a determines whether the "job a" has been stored in the print job database 51 included in the first print apparatus 20a (S57). When determining that the "job a" has been stored (S57: Yes), the first print apparatus 20a reads the "job a" from the print job database 51 and starts printing of the read "job a" (S58).

On the other hand, when determining that the "job a" has not been stored (S57: No), the first print apparatus 20a requests one of the print apparatuses 20 which stores the "job a", that is, the second print apparatus 20b in this embodiment, to perform the normal printing (S59). In response to the request, the second print apparatus 20*b* transmits the "job a" to the first print apparatus 20*a* (S60). The first print apparatus 20*a* starts printing of the "job a" transmitted from the second print apparatus 20*b* (S61). The process from step S51 to step S61 described above corresponds to the normal printing process.

Subsequently, a flow of the distributed printing process will be described. As illustrated in FIG. 12, when receiving a login operation performed by the user on the card reader 23 or the operation panel 24 (S71), the second print apparatus 20*b* transmits login information obtained by the login operation to the user authentication server 4 (S72). The user authentication server 4 compares the login information transmitted from the second print apparatus 20*b* with user information stored in the user information database 12*d* so as to perform the user authentication (S73).

The user authentication server 4 transmits a result of the user authentication to the second print apparatus 20*b* (S74). When the user authentication is successfully performed, the user authentication server 4 transmits identifying information for identifying the user along with a result of the authentication. The second print apparatus 20*b* displays the print job list 31 which is a list of print jobs to which identifying information is added among print job lists 31 stored in the RAM 21*c* in the print job list screen D based on the identifying information transmitted from the user authentication server 4 (S75).

When receiving an operation of selecting the "job a" which is in a print state of "printing" in the print job list screen D (S76), the second print apparatus 20*b* requests the first print apparatus 20*a* to perform the distributed printing of the "job a" (S77). When receiving the request for the distributed printing of the "job a" from the second print apparatus 20*b*, the first print apparatus 20*a* interrupts the printing of the "job a" (S78) and divides the "job a" into a first distributed printing job and a second distributed printing job (S79).

Thereafter, the first print apparatus 20*a* transmits the second distributed printing job of the "job a" to the second print apparatus 20*b* (S80). The second print apparatus 20*b* starts printing of the second distributed printing job of the "job a" transmitted from the first print apparatus 20*a* (S81). Furthermore, the first print apparatus 20*a* starts printing of the first distributed printing job of the "job a" (S82). The process from step S71 to step S82 described above corresponds to the distributed printing process.

As described above, since the print apparatuses 20 may control the distributed printing according to the second print system SY2 of the second embodiment, a dedicated apparatus for controlling the distributed printing is not additionally required.

Note that the following modifications may be employed in the second embodiment.
Modification 2-1

Although the first print apparatus 20*a* controls the distributed printing according to the foregoing second embodiment, the second print apparatus 20*b* may control the distributed printing. It is assumed, in this modification, that one of the print apparatuses 20 which requests the distributed printing of a print job controls the distributed printing. Note that each of the first and second print apparatuses 20*a* and 20*b* may serve as an apparatus which requests the distributed printing or an apparatus which receives the request for the distributed printing. However, it is assumed that the second print apparatus 20*b* controls the distributed printing as a process following the processes in FIGS. 10 and 11, hereinafter. In this modification, the print controller 21 of the second print apparatus 20*b* is an example of an "obtaining section" and a "controller".

Figure 13:
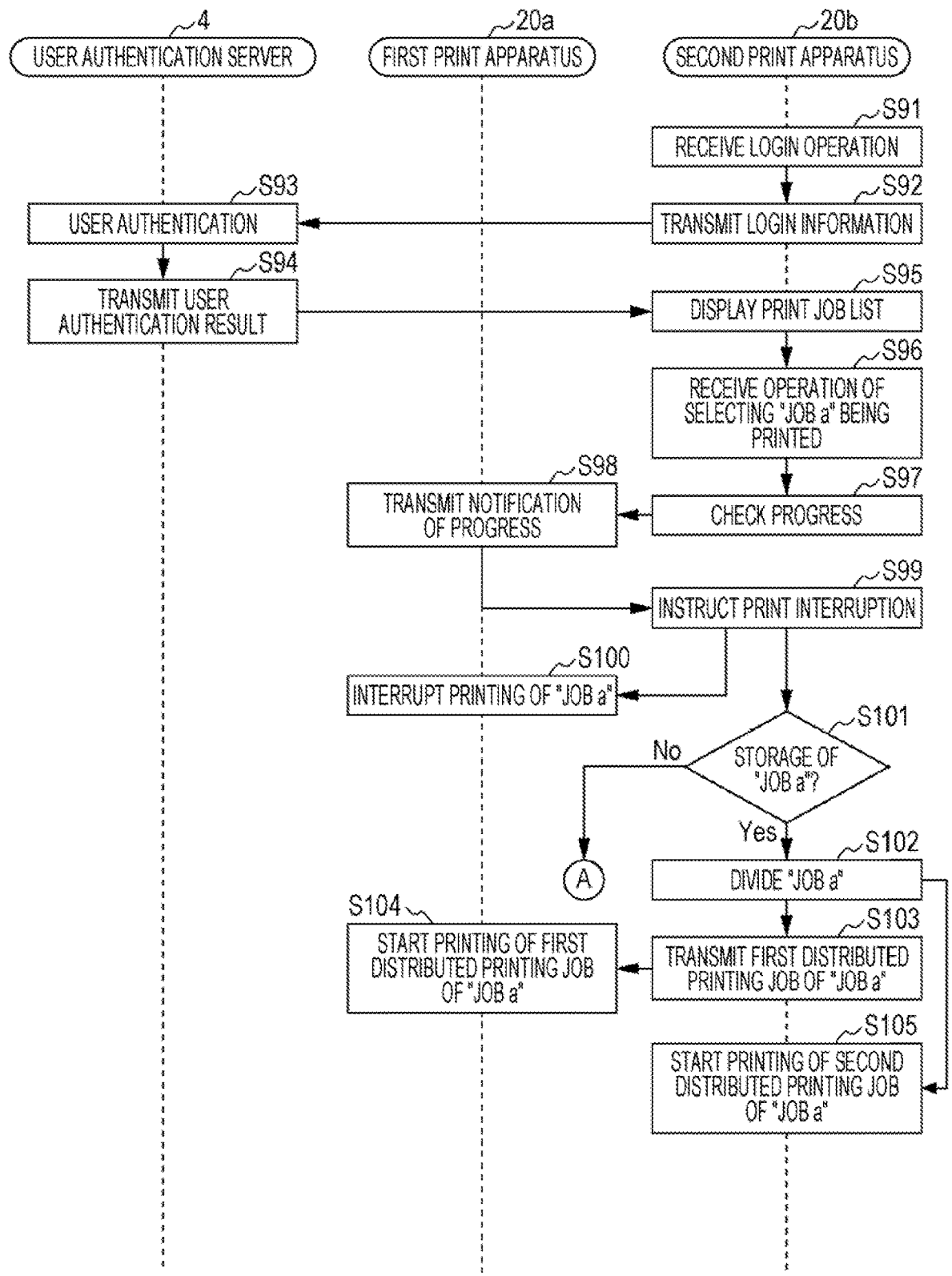
FIG. 13 is a flowchart of a flow of a print process following the flowchart of FIG. 11 according to a modification.
Figure 14:
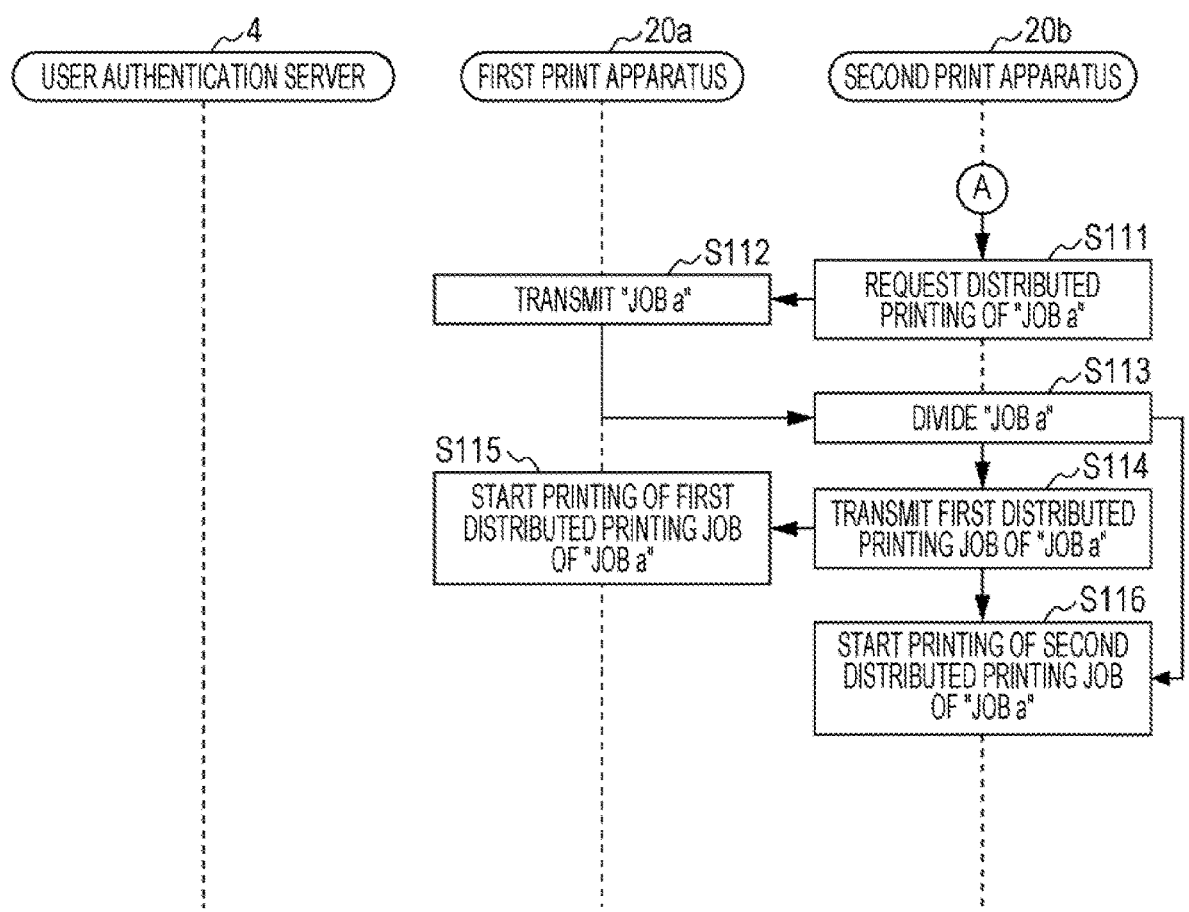
FIG. 14 is a flowchart of a flow of the print process following the flowchart of FIG. 13.

A flow of the distributed printing process performed after the processes in FIGS. 10 and 11 will be described with reference to FIGS. 13 and 14. Note that a process from step S91 to step S96 in FIG. 13 is the same as the process from step S71 to step S76 of the second embodiment described above (refer to FIG. 12), and therefore, a detailed description thereof is omitted. When receiving an operation of selecting the "job a" which is in a print state of "printing" in the print job list screen D (S96), the second print apparatus 20*b* checks the first print apparatus 20*a* to obtain progress of the "job a" (S97). In response to this operation, the first print apparatus 20*a* notifies the second print apparatus 20*b* of the progress of the "job a" (S98).

When receiving the notification of the progress, the second print apparatus 20*b* instructs the first print apparatus 20*a* to interrupt the printing in accordance with the progress (S99). The first print apparatus 20*a* interrupts the printing of the "job a" in response to the instruction issued by the second print apparatus 20*b* (S100). After instructing the interruption of the printing of the "job a", the second print apparatus 20*b* determines whether the "job a" has been stored in the print job database 51 of the second print apparatus 20*b* (S101).

When determining that the "job a" has been stored (S101: Yes), the second print apparatus 20*b* reads the "job a" from the print job database 51 and divides the read "job a" into a first distributed printing job and a second distributed printing job (S102). The second print apparatus 20*b* transmits the first distributed printing job of the "job a" to the first print apparatus 20*a* (S103). The first print apparatus 20*a* starts printing of the first distributed printing job of the "job a" (S104). Furthermore, the second print apparatus 20*b* starts printing of the second distributed printing job of the "job a" (S105).

On the other hand, when determining that the "job a" has not been stored (S101: No), the second print apparatus 20*b* requests the first print apparatus 20*a* to perform the distributed printing of the "job a" (S111). When receiving the request for the distributed printing of the "job a" from the second print apparatus 20*b*, the first print apparatus 20*a* reads the "job a" from the print job database 51 of the first print apparatus 20*a* and transmits the read "job a" to the second print apparatus 20*b* (S112). The second print apparatus 20*b* divides the obtained "job a" into a first distributed printing job and a second distributed printing job (S113).

The second print apparatus 20*b* transmits the first distributed printing job of the "job a" to the first print apparatus 20*a* (S114). The first print apparatus 20*a* starts printing of the first distributed printing job of the "job a" (S115). Furthermore, the second print apparatus 20*b* starts printing of the second distributed printing job of the "job a" (S116). The process from step S91 to step S116 described above corresponds to the distributed printing process.

As described above, the first print apparatus 20*a* or the second print apparatus 20*b* may control the distributed printing both when serving as an apparatus which requests the distributed printing and when serving as an apparatus which receives a request for the distributed printing.

Note that, in step S114 in the flowchart above, the second print apparatus 20*b* may transmit information specifying a print job included in the first distributed printing job to the first print apparatus 20*a* instead of the first distributed printing job of the "job a". The information specifying a print job included in the first distributed printing job is information indicating a first page to a 10th page of a third copy, for example.

Modification 2-2

As a further modification of the modification 2-1, one of the first and second print apparatuses 20a and 20b may not control the distributed printing but one of the print apparatuses 20 serving as an apparatus which requests the distributed printing or which receives a request for the distributed printing may control the distributed printing.

Modification 2-3

As a further modification of the modification 2-1, when a fixed one of the print apparatuses 20 obtains a print job from the client PC 1, the print apparatus 20 may control the distributed printing. In this case, one of the print apparatuses 20 which obtains the print job from the client PC 1 may perform the user authentication. According to this configuration, the user authentication server 4 is not required.

Modification 2-4

A login operation may not be required for one of the print apparatuses 20 which obtains a print job from the client PC 1. In this case, the client PC 1 transmits a print job to a specified one of the print apparatuses 20 and causes the print apparatus 20 to execute push printing.

Although the two embodiments and the various modifications are illustrated above, combinations of the embodiments and the modifications may be made. Furthermore, methods for executing the processes of the client PC 1, the print apparatuses 2, the print server 3, and the print apparatuses 20 illustrated in the embodiments and the modifications, programs for executing the processes, and a computer-readable storage medium storing the programs are also included in the scope of the present disclosure. Furthermore, various information processing terminals, such as tablet terminals and smartphones, may be employed instead of the client PC 1. Various modifications may be made without departing from the scope of the present disclosure.

APPENDIX

Hereinafter, a print system, a print apparatus, a method for controlling the print system, and a storage medium will be described.

In a first print system SY1 controlling a first print apparatus 2a and a second print apparatus 2b by a client PC 1, the client PC 1 generates, when obtaining a distributed printing request of a print job being printed by the first print apparatus 2a from the second print apparatus 2b based on a user operation performed on the second print apparatus 2b, a first distributed printing job for causing the first print apparatus 2a to print a first portion of an unprinted portion of a print job and a second distributed printing job for causing the second print apparatus 2b to print a second portion of the unprinted portion.

The client PC 1 controls the first print apparatus 2a and the second print apparatus 2b and includes the PC communication section 13 which obtains a distributed printing request of a print job being printed by the first print apparatus 2a from the second print apparatus 2b based on a user operation performed on the second print apparatus 2b and a PC controller 11 which generates, when obtaining the distributed printing request from the second print apparatus 2b, a first distributed printing job for causing the first print apparatus 2a to print a first portion of an unprinted portion of the print job and a second distributed printing job for causing the second print apparatus 2b to print a second portion of the unprinted portion.

A program causes the client PC 1 controlling the first print apparatus 2a and the second print apparatus 2b to execute obtaining a distributed printing request of a print job being printed by the first print apparatus 2a from the second print apparatus 2b based on a user operation performed on the second print apparatus 2b and generating, when obtaining the distributed printing request from the second print apparatus 2b, a first distributed printing job for causing the first print apparatus 2a to print a first portion of an unprinted portion of the print job and a second distributed printing job for causing the second print apparatus 2b to print a second portion of the unprinted portion.

A method for controlling the client PC Icontroling the first print apparatus 2a and the second print apparatus 2b includes obtaining a distributed printing request of a print job being printed by the first print apparatus 2a from the second print apparatus 2b based on a user operation performed on the second print apparatus 2b and generating, when obtaining the distributed printing request from the second print apparatus 2b, a first distributed printing job for causing the first print apparatus 2a to print a first portion of an unprinted portion of the print job and a second distributed printing job for causing the second print apparatus 2b to print a second portion of the unprinted portion.

When obtaining a distributed printing request for a print job being printed by the first print apparatus 2a from the second print apparatus 2b, the client PC 1 divides an unprinted portion of the print job into a first distributed printing job to be printed by the first print apparatus 2a and a second distributed printing job to be printed by the second print apparatus 2b. With this configuration, the user may instruct the distributed printing during printing of a print job.

In the first print system SY1 described above, The client PC 1 may interrupt printing of a print job being printed by the first print apparatus 2a when obtaining a distributed printing request from the second print apparatus 2b and divide an unprinted portion of the print job obtained at a time when the printing is interrupted into a first distributed printing job and a second distributed printing job.

With this configuration, the printing of the print job being printed is interrupted by the first print apparatus 2a when the client PC 1 obtains the distributed printing request, and therefore, the division into the first and second distributed printing jobs may be appropriately performed.

In the first print system SY1 described above, the first print apparatus 2a and the second print apparatus 2b may receive a print operation when user authentication is successfully performed. When the user logs into the second print apparatus 2b and the client PC 1 obtains login information from the second print apparatus 2b, the client PC 1 may transmit the print job list 31 which is a list of print jobs stored in the second print apparatus 2b such that the print jobs are associated with users who log in the second print apparatus 2b to the second print apparatus 2b. Thereafter, the client PC 1 may cause the second print apparatus 2b to display the print job list 31, and when the user selects the print job being printed by the first print apparatus 2a in the displayed print job list 31, the second print apparatus 2b may transmit the distributed printing request of the selected print job to the client PC 1.

With this configuration, the first and second print apparatuses 2a and 2b receive a print operation when the user authentication is successfully performed, and therefore, a security effect may be expected. Furthermore, the second print apparatus 2b displays the print job list 31 listing logged-in users, and therefore, the user may execute the distributed printing by selecting a print job being printed by the first print apparatus 2a in the displayed print job list 31.

In the first print system SY1, it is assumed that the first print apparatus 2a performs printing of a print job for printing of a plurality of copies. In this example, when obtaining a distributed printing request from the second print apparatus 2b, the client PC 1 may divide unprinted portion of the print job being printed by the first print apparatus 2a into first and second distributed printing jobs in a unit of page. Furthermore, when obtaining a distributed printing request from a third print apparatus after the printing of the first distributed printing job is started by the first print apparatus 2a, the client PC 1 may divide an unprinted portion of the first distributed printing job into a third distributed printing job to be printed by the first print apparatus 2a and a fourth distributed printing job to be printed by the third print apparatus in a unit of copy.

When obtaining a distributed printing request from the second print apparatus 2b, the client PC 1 divides an unprinted portion of the print job being printed by the first print apparatus 2a in a unit of page. On the other hand, when obtaining a distributed printing request from the second print apparatus 2b, the client PC 1 divides an unprinted portion of the first distributed printing job being printed by the first print apparatus 2a in a unit of copy. With this configuration, in the first print system SY1, when a plurality of copies are to be printed by the distributed printing using two print apparatuses 2, printed matters printed by the individual print apparatuses 2 are merely stacked on each other, and therefore, the division may be performed in a unit of page so that a printing time is efficiently reduced. On the other hand, when the distributed printing is performed using three print apparatuses 2, it is difficult to appropriately collect printed matters printed by the individual print apparatuses 2 in appropriate order, and therefore, the division may be performed in a unit of copy taking easiness of collection in appropriate order into consideration.

In the first print system SY1, the client PC 1 may be different from the first and second print apparatuses 2a and 2b.

With this configuration, the first print system SY1 may be configured by three apparatuses, that is, the first print apparatus 2a, the second print apparatus 2b, and the client PC 1.

In the first print system SY1 described above, the first print apparatus 20a or the second print apparatus 20b may include a print control apparatus.

With this configuration, the first print system SY1 may be configured by two apparatuses, that is, the first print apparatus 20a serving as the print control apparatus and the second print apparatus 20b or the first print apparatus 20a and the second print apparatus 20b serving as the print control apparatus.

What is claimed is:

1. A print system controlling first and second print apparatuses by a print control apparatus, wherein
the print control apparatus is configured such that, in response to obtaining a request from the second print apparatus for performing distributed printing of a print job being printed by the first print apparatus, the request having been generated by the second print apparatus based on a user operation performed on the second print apparatus, the print control apparatus
generates a first distributed printing job for causing the first print apparatus to print a first portion in an unprinted portion of a print job and a second distributed printing job for causing the second print apparatus to print a second portion in the unprinted portion.

2. The print system according to claim 1, wherein
the print control apparatus
is configured to interrupt the printing of the print job being printed by the first print apparatus when obtaining the distributed printing request and
is configured to divide the unprinted portion of the print job into the first distributed printing job and the second distributed printing job when the printing is interrupted.

3. The print system according to claim 1, wherein
the first and second print apparatuses are configured to receive a print operation when user authentication is successfully performed,
the print control apparatus
is configured to transmit a print job list which is a list of print jobs stored in the second print apparatus such that the print jobs are associated with users who login to the second print apparatus to the second print apparatus so as to display the print job list in the second print apparatus when obtaining login information from the second print apparatus after a user logs into the second print apparatus, and
the second print apparatus
is configured to transmit, when a user selects the print job being printed in the displayed print job list using the first print apparatus, the distributed printing request of the selected print job to the print control apparatus.

4. The print system according to claim 1, wherein
when the print job for printing a plurality of copies is printed by the first print apparatus,
the print control apparatus
is configured to divide an unprinted portion of the print job being printed by the first print apparatus into the first and second distributed printing jobs in a unit of page when obtaining the distributed printing request from the second print apparatus, and
is configured to divide, when obtaining the distributed printing request from a third print apparatus after the first print apparatus starts printing of the first distributed printing job, an unprinted portion of the first distributed printing job into a third distributed printing job to be printed by the first print apparatus and a fourth distributed printing job to be printed by the third print apparatus in a unit of copy.

5. The print system according to claim 1, wherein
the print control apparatus is different from the first and second print apparatuses.

6. The print system according to claim 1, wherein
the first print apparatus or the second print apparatus includes the print control apparatus.

7. A print control apparatus controlling a first print apparatus and a second print apparatus, the print control apparatus comprising:
an obtaining section configured to obtain a distributed printing request from the second print apparatus, the distributed printing request having been generated by the second print apparatus based on a user operation performed on the second print apparatus, the distributed printing request being for performing distributed printing of a print job being printed by the first print apparatus; and
a controller configured to, in response to obtaining the distributed printing request, generate a first distributed printing job for causing the first print apparatus to print a first portion of an unprinted portion of the print job and a second distributed printing job for causing the second print apparatus to print a second portion of the unprinted portion.

8. A non-transitory computer-readable storage medium storing a program structured to cause a print control apparatus controlling a first print apparatus and a second print apparatus to execute:

obtaining a distributed printing request from the second print apparatus, the distributed printing request having been generated by the second print apparatus based on a user operation performed on the second print apparatus, the distributed printing request being for performing distributed printing of a print job being printed by the first print apparatus; and generating, in response to obtaining the distributed printing request, a first distributed printing job for causing the first print apparatus to print a first portion of an unprinted portion of the print job and a second distributed printing job for causing the second print apparatus to print a second portion of the unprinted portion.

* * * * *